United States Patent [19]
Van Oel et al.

[11] Patent Number: 5,327,330
[45] Date of Patent: Jul. 5, 1994

[54] INNER SEALED LAMP-WITHIN-A LAMP HEADLAMP FOR A MOTOR VEHICLE

[75] Inventors: Robert W. Van Oel, Saline; James B. Winowiecki, Northville, both of Mich.

[73] Assignee: Ford Motor Company, Dearborn, Mich.

[21] Appl. No.: 43,674

[22] Filed: Apr. 7, 1993

[51] Int. Cl.⁵ .............................................. B60Q 1/00
[52] U.S. Cl. ..................... 362/61; 362/267; 362/277; 362/294
[58] Field of Search ................ 362/61, 267, 66, 277, 362/294, 306, 307, 308

[56] References Cited

U.S. PATENT DOCUMENTS

| | | | |
|---|---|---|---|
| 4,249,232 | 2/1981 | Dick | 362/61 |
| 4,471,413 | 9/1984 | Dick | 362/80 |
| 4,569,007 | 2/1986 | Dick | 362/294 |
| 4,574,334 | 3/1986 | Igura | 362/66 |

FOREIGN PATENT DOCUMENTS

| | | | |
|---|---|---|---|
| 1005465 | 8/1954 | Fed. Rep. of Germany | 362/277 |
| 193492 | 11/1957 | Fed. Rep. of Germany | 362/277 |

Primary Examiner—James C. Yeung
Attorney, Agent, or Firm—Roger May; Daniel Stock

[57] ABSTRACT

A lamp-within-a-lamp headlamp unit includes an inner lamp body which is adjustably received within a first end of an outer lamp housing. A second end of the outer lamp housing defines a lens through which light is projected from the headlamp unit. The inner lamp body sealably receives a lamp bulb through a bulb access opening in a first end of the lamp body which is accessed through the first end of the outer housing. Light is projected from the second end of the lamp body which can be open if appropriate focusing reflectors are provided adjacent the lamp bulb or closed by an internal lens. An area surrounding the second end of the lamp body is sealed to the outer lamp housing by a flexible inner seal which extends between the lamp body and an inner portion of the outer lamp housing. The flexible inner seal permits the inner lamp body to be adjusted relative to the outer lamp housing which is secured to a motor vehicle for aligning or aiming the light beam projected from the headlamp unit. At the same time, the flexible inner seal is sufficiently resilient so as to provide shock adsorbing support for the inner lamp body. The inner sealed headlamp permits alignment or aiming devices for the headlamp to be open to the atmosphere. A one-way vent may be installed in the outer lens of the outer lamp housing or a lens extension which extends between the outer lens and the first end of the outer lens housing.

20 Claims, 3 Drawing Sheets

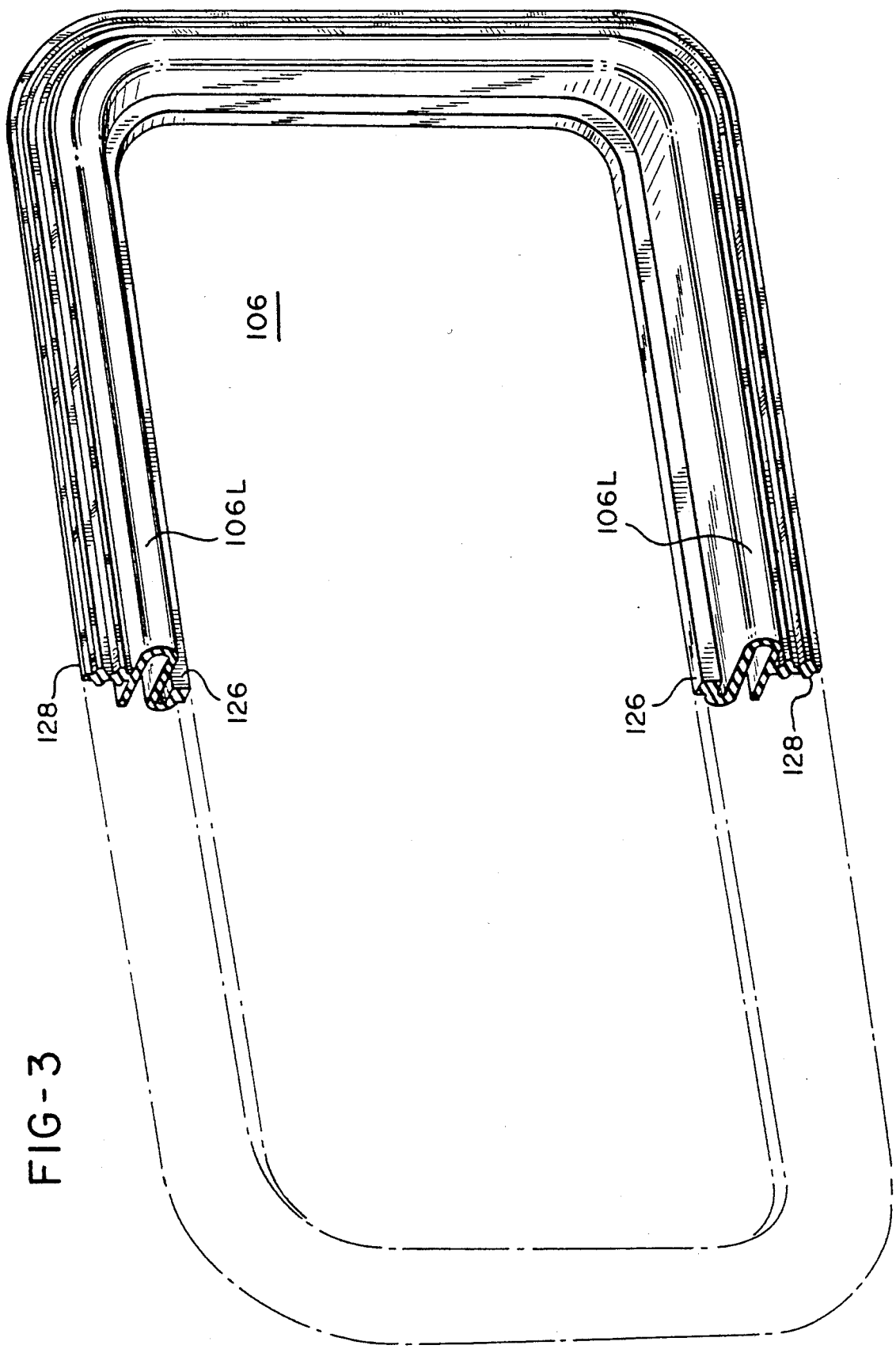

5,327,330

INNER SEALED LAMP-WITHIN-A LAMP HEADLAMP FOR A MOTOR VEHICLE

BACKGROUND OF THE INVENTION

The present invention relates in general to headlamps for a motor vehicle and, more particularly, to an improved lamp-within-a-lamp headlamp design having an inner seal between an inner lamp body and an outer headlamp housing.

Headlamps for motor vehicles have evolved from sealed beam systems wherein self-contained headlamp units each include one or two filaments, a reflector and a lens, all of which are formed into a glass shell with terminals extending out the back of the unit for electrical connections to the filament or filaments. Such sealed headlamp units are mounted into support frames which are adjusted typically from the front of the vehicle to properly align or aim the light beams projected from the vehicle.

To simplify headlight installation in a vehicle, adjustment of headlamp alignment and replacement of burned-out headlamp filaments, headlamp units have been designed which are adjustably supported within a vehicle for receiving a headlamp bulb, typically a halogen bulb, from the rear of the unit. Such improved headlamp units eliminate substantial amounts of waste when headlamp filaments burn out and must be replaced. Headlamp alignment or aiming is simplified and typically performed from the rear of the headlamp unit. Exemplary headlamp units of this form are disclosed in U.S. Pat. No. 4,471,413 and No. 4,569,007.

Another form of improved headlamp unit is disclosed, for example, in U.S. Pat. No. 4,574,334. This form of headlamp unit includes a lamp-within-a-lamp, i.e. a reflector which supports a bulb is adjustably supported within a lamp housing. As is apparent from this patent, the inner lamp or reflector is supported near the ends of adjustment screws, pivot members and the like such that it is subject to being deflected due to forces produced as the vehicle including the headlamp unit is driven. Further, the lamp housing is sealed such that dirt and moisture cannot accumulate on the lens which is on the front of the reflector. Since the lamp housing is sealed, all alignment adjusters must also be sealed where they enter the housing or else the housing seal will be compromised. The added complexity required by sealing the alignment adjusters is also apparent from a review of this patent.

SUMMARY OF THE INVENTION

According to the method and apparatus of the present invention, a lamp-within-a-lamp headlamp unit comprises an inner lamp body which is adjustably received within a first end of an outer lamp housing. A second end of the outer lamp housing defines a lens through which light is projected from the headlamp unit.

The inner lamp body sealably receives a lamp bulb through a bulb access opening in a first end of the lamp body which extends beyond or is accessed through the first end of the outer housing. Light is projected from the second end of the lamp body which can be open if appropriate focusing reflectors are provided adjacent the lamp bulb or closed by an internal lens.

An area surrounding the second end of the lamp body is sealed to the outer lamp housing by a flexible inner seal which extends between the lamp body and an inner portion of the outer lamp housing. The flexible inner seal permits the inner lamp body to be adjusted relative to the outer lamp housing which is secured to a motor vehicle for aligning or aiming the light beam projected from the headlamp unit. At the same time, the flexible inner seal is sufficiently resilient so as to provide shock absorbing support for the inner lamp body.

The inner sealed lamp-within-a-lamp design of the present invention maintains a forward portion of the outer lamp housing and the interior of the inner lamp body sealed against the entrance of dirt or moisture whether an inner lens is provided or not. If an inner lens is provided, the inner lamp body is sealed between the inner lens and the sealingly received lamp bulb, if not, the inner lamp body is in communication with the forward portion of the outer lamp housing and the entire volume is sealed between the sealingly received lamp bulb and the inner seal. A one-way vent may be installed in the outer lens of the outer lamp housing or a lens extension which extends between the outer lens and the first end of the outer lens housing.

In accordance with one aspect of the present invention, a headlamp unit for a motor vehicle comprises lamp body means defining an inner cavity for sealingly receiving and supporting a headlamp bulb in a first end of the inner cavity of the lamp body means and projecting light generated by the bulb from a second end of the inner cavity opposite to the first end. Housing means having an interior is provided for adjustably receiving the lamp body means in a first end thereof and defining a lens in the second end thereof opposite to the first end such that light projected from the lamp body means is projected through the lens. Flexible inner seal means extend between the second end of the lamp body means and the housing means for sealing a portion of the interior of the housing means to the inner cavity of the lamp body means, the sealed portion of the interior of the housing means extending from the lens approximately to the lamp body means.

In accordance with another aspect of the present invention, a method of making a headlamp unit for a motor vehicle comprises the steps of: sealingly mounting a headlamp bulb in a lamp body such that light generated by the headlamp bulb is reflected from an inner reflective surface of the lamp body and projected out an end of the lamp body; adjustably mounting the lamp body in a headlight housing such that the lamp body is positioned to project light out a lens defined by the housing; and, sealing an area between the lamp body and the headlight housing such that the portion of the housing extending from the lens approximately to the lamp body and the inner surface of the lamp body and the headlamp bulb is sealed from the atmosphere.

BRIEF DESCRIPTION OF THE INVENTION

The invention is described with reference to an exemplary embodiment illustrated in the attached drawing and made in accordance with a corresponding method of the invention. In the drawings:

FIG. 3 is a partially broken-away perspective view of an inner seal used in the headlamp of FIGS. 1 and 2.

DETAILED DESCRIPTION OF THE INVENTION

Figure 1:
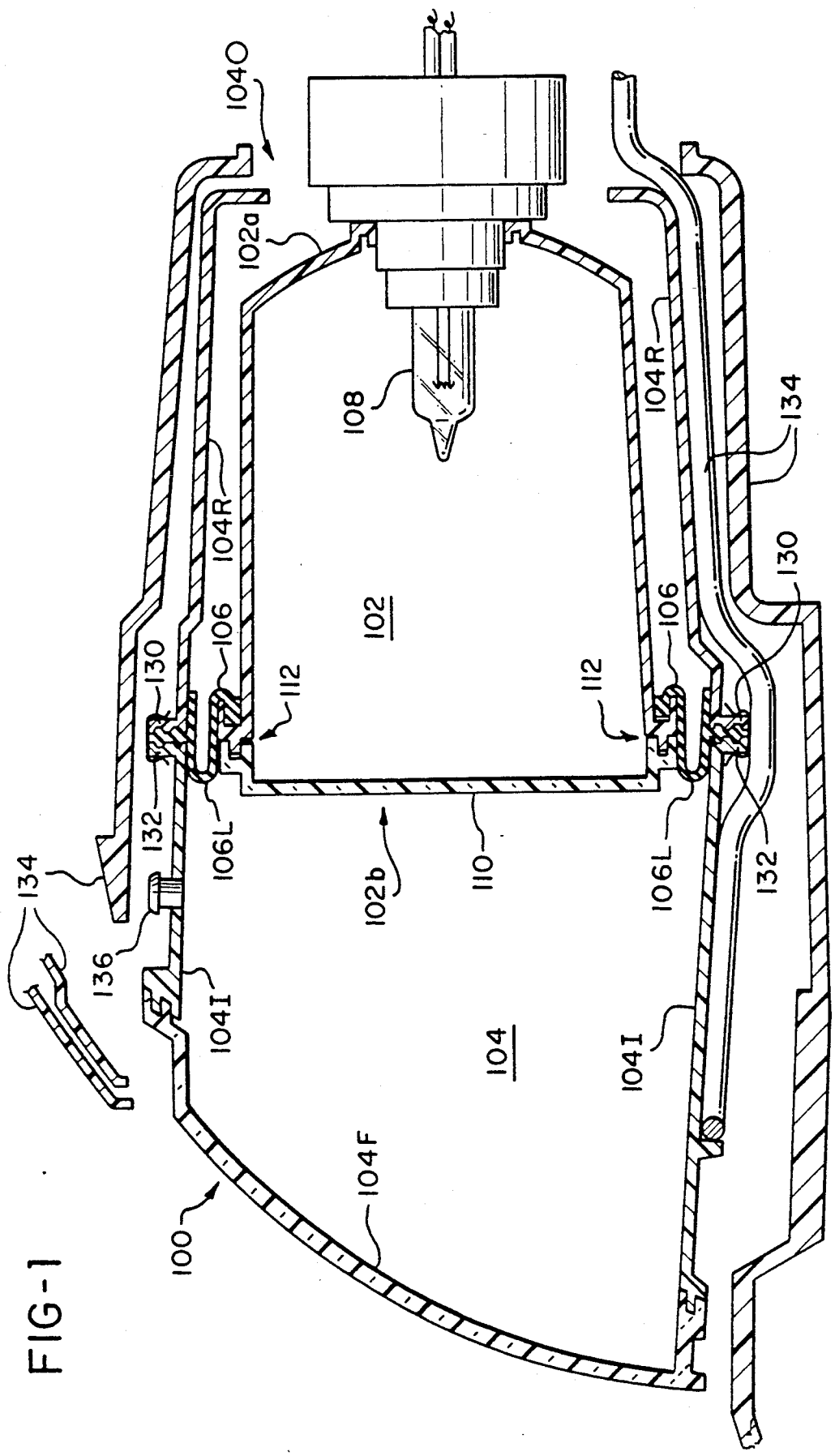
FIG. 1 is a vertical section through a headlamp according to the invention.
Figure 2:
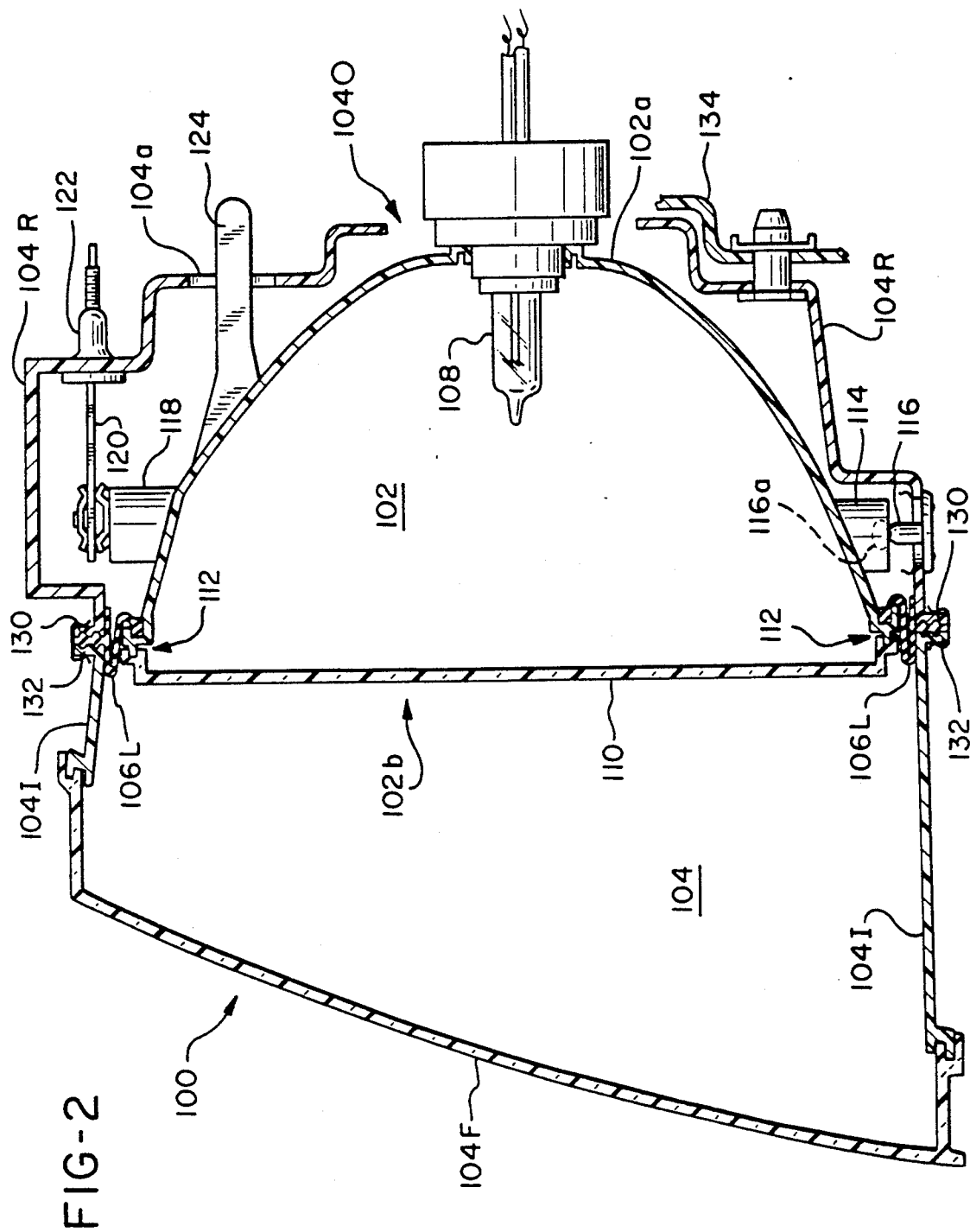
FIG. 2 is a horizontal section through the headlamp of FIG. 1.

In FIGS. 1 and 2, a lamp-within-a-lamp headlight unit 100 for a motor vehicle is shown. In the illustrated embodiment, the headlamp unit 100 includes lamp body means comprising an inner lamp body 102, housing means comprising an outer housing 104, and flexible inner seal means comprising a seal 106 as best shown in FIG. 3. The inner lamp body 102 sealingly receives a headlamp bulb 108 in a first end 102a of an inner cavity defined by the inner lamp body 102. When the bulb 108 is lighted, light is projected from a second end 102b of the inner lamp body 102.

In the illustrated embodiment of FIGS. 1 and 2, inner lens means comprising an inner lens 110 is secured to the second end 102b of the inner lamp body 102 such that light from the bulb 108 passes through the lens 110. As illustrated, the inner lens 110 is secured to one side of a flange 112 which surrounds and extends outwardly from the second end 102b of the inner lamp body 102.

The inner lamp body 102 is adjustably received in the interior of the outer housing 104. As illustrated in FIG. 2, the inner lamp body 102 defines a support boss 114 which includes a generally spherical aperture for receiving a ball extension 116 mounted to the outer housing 104. This balljoint mounting permits the inner lamp body to be pivoted about the ball 116a of the ball extension 116. The inner lamp body 102 also defines a horizontal adjustment member 118 to which a horizontal adjusting screw 120 is mounted. The horizontal adjusting screw 120 is threadedly received in a connector 122 secured to the outer housing 104 for horizontal adjustment of the inner lamp body 102 and hence the headlight unit 100. An opening 104O provides access for removal and insertion of the bulb 108.

The inner lamp body 102 also defines a vertical adjustment member 124 which extends through an opening 104a of the outer housing 104. The vertical adjustment member 124 is engaged by a vertical adjusting device (not shown) which moves the member 124 up and down (in and out of the drawing as shown in FIG. 2).

The inner lamp body 102 is mounted in the interior of a first end or rear portion 104R of the outer housing 104. The second end or front portion of the outer housing 104 is a lens 104F through which light is projected from the inner lamp body 102 when the bulb 108 is lighted. In the illustrated embodiment, the lens 104F is connected to the rear portion 104R of the outer housing 104 by a lens extension member comprising an intermediate portion 104I of the outer housing 104.

The seal 106 is continuous and includes an inner bead 126 which is sealingly received in a groove in the rear of the flange 112 which surrounds and extends outwardly from the second end 102b of the inner lamp body 102. The inner bead 126 of the seal 106 is mechanically and also preferably adhesively sealed to the rear of the flange 112 of the inner lamp body 102. The seal 106 defines a seal loop 106L which extends from the inner lamp body 102 to the outer housing 104. The seal 106 includes a dual beaded outer flange 128 which is mechanically sealed by being engaged between conformably formed flanges 130, 132 on the rear portion 104R and the intermediate portion 104I of the outer housing 104, respectively. The outer flange 128 may alternately or additionally be adhesively secured to the outer housing 104.

The headlight unit 100 is secured to a motor vehicle, represented by fragmented pieces 134 in FIGS. 1 and 2, in a conventional manner which will not be described herein. Vent means comprising a one way (outward) vent 136 preferably is provided through the lens or through the lens extension, intermediate portion 104I of the outer housing 104 as shown in FIG. 1, to ventilate the sealed portion of the interior of the outer housing 104.

In some headlight units, the inner lens 110 may be eliminated by forming the interior portion of the inner lamp body 102 as a complex reflector which not only reflects light toward the outer lens 104F but also focuses the light. The illustrated structure of the flange 112 on the inner lamp body 102 is adapted for both type headlight units, i.e. with or without an inner lens 110. The rear portion of the flange 112 defines a groove for receiving the seal 106 while the front of the flange 112 defines a ridge to which a lens, such as the lens 110, can be secured or not depending upon the design of the headlight unit.

The headlight unit will still function as proposed with or without the inner lens 110. If the lens 110 is provided, the front portion of the outer housing is sealed from the outer lens 104F approximately to the inner lens 110 to prevent moisture and dirt from entering the sealed portion and dimming the light projected from the headlight unit. If the lens is not provided, the front portion of the outer housing is sealed to the inner cavity of the lamp body 106 which is also sealed by proper insertion of the bulb 108 into the lamp body 106.

As should be apparent from a review of the foregoing description and the drawing figures, the headlight unit 100 according to the present invention permits the adjusting mechanisms and bulb access into the outer housing 104 to be open to the atmosphere rather than being sealed as before. This arrangement permits much simpler construction and hence reduced cost for the headlight unit 100.

In addition to providing a sealed interior for the headlight unit 100, the seal 106 is sufficiently resilient that it provides shock absorbing support for the inner lamp body 106. The seal loop 106L enhances flexibility of the seal 106 and permits movement of the seal 106 which facilitates adjustment of the inner lamp body 102 relative to the outer housing 104.

Having thus described the present invention in detail and by reference to preferred embodiments thereof, it will be apparent that modifications and variations are possible without departing from the scope of the invention defined in the appended claims.

What is claimed is:

1. A headlamp unit for a motor vehicle comprising:

lamp body means defining an inner cavity for sealingly receiving and supporting a headlamp bulb in a first end of said inner cavity of said lamp body means and projecting light generated by said bulb from a second end of said inner cavity opposite to said first end;

housing means having an interior for adjustably receiving said lamp body means in a first end thereof and defining a lens in the second end thereof opposite to said first end such that light projected from said lamp body means is projected through said lens; and flexible inner seal means extending between said second end of said lamp body means and said housing means for sealing a portion of the interior of said housing means to said inner cavity of said lamp body means, said sealed portion of the interior of said housing means extending from said lens approximately to said lamp body means.

2. A headlamp unit for a motor vehicle as claimed in claim 1 further comprising inner lens means secured to said lamp body means such that light projected from said lamp body means passes through said inner lens before being projected through said lens of said housing means.

3. A headlamp unit for a motor vehicle as claimed in claim 1 wherein said first end of said housing means defines an access opening for insertion and removal of said headlamp bulb.

4. A headlamp unit for a motor vehicle as claimed in claim 1 wherein said lens of said housing means includes vent means for venting said sealed portion of the interior of said housing.

5. A headlamp unit for a motor vehicle as claimed in claim 1 wherein said housing means further comprises lens extension means for interconnecting said lens of said housing means and said first end of said housing means.

6. A headlamp unit for a motor vehicle as claimed in claim 5 wherein said lens extension means of said housing means includes vent means for venting said sealed portion of the interior of said housing means.

7. A headlamp unit for a motor vehicle as claimed in claim 1 wherein said flexible inner seal means is secured to said lamp body means and said housing means.

8. A headlamp unit for a motor vehicle as claimed in claim 7 wherein said flexible inner seal means is mechanically secured to said lamp body means and said housing means.

9. A headlamp unit for a motor vehicle as claimed in claim 7 wherein said flexible inner seal means is mechanically secured to said lamp body means and adhesively secured to said housing means.

10. A headlamp unit for a motor vehicle comprising:
    lamp body means for sealingly receiving and supporting a headlamp bulb in a first end of said lamp body means which defines an interior reflective surface surrounding said headlamp bulb when received in said lamp body means for projecting light generated by said headlamp bulb from a second end of said lamp body means;
    housing means having an interior for receiving said lamp body means therein, said housing means defining a first portion for receiving said lamp body means and a second portion secured to said first portion for defining a lens positioned to pass light projected from said lamp body means; and
    continuous flexible inner seal means surrounding said lamp body means and extending to said housing means for sealing said housing means to said lamp body means such that the second portion of said housing means and the interior of said lamp body means are sealed when a headlamp bulb is sealingly received in said lamp body means.

11. A headlamp unit for a motor vehicle as claimed in claim 10 wherein said continuous flexible inner seal means surrounds said second end of said lamp body means and is sufficiently resilient so as to provide shock absorbing support for said lamp body means.

12. A headlamp unit for a motor vehicle as claimed in claim 11 wherein said first portion of said housing means includes a back wall positioned substantially opposite to said lens of said housing means, said back wall having an opening therein sized for inserting and removing said headlamp bulb.

13. A headlamp unit for a motor vehicle as claimed in claim 12 wherein said lamp body means is supported within said housing means by lamp body means orientation adjustment means for adjusting the horizontal and vertical orientation of said lamp body means within said housing means.

14. A headlamp unit for a motor vehicle as claimed in claim 13 further comprising inner lens means secured to said lamp body means such that light projected from said lamp body means passes through said inner lens before being projected through said lens of said housing means.

15. A headlamp unit for a motor vehicle as claimed in claim 14 wherein said lens of said housing means includes vent means for venting said sealed portion of the interior of said housing.

16. A headlamp unit for a motor vehicle as claimed in claim 14 wherein said second portion of said housing means further defines a lens extension member for interconnecting said lens of said housing means and said first portion of said housing means.

17. A headlamp unit for a motor vehicle as claimed in claim 16 wherein said lens extension member of said second portion of said housing means includes vent means for venting said sealed portion of said housing means.

18. A method of making a headlamp unit for a motor vehicle comprising the steps of:
    sealingly mounting a headlamp bulb in a lamp body such that light generated by the headlamp bulb is reflected from an inner reflective surface of said lamp body and projected out an end of said lamp body;
    adjustably mounting said lamp body in an interior of a headlight housing such that said lamp body is positioned to project light out a lens defined by said housing; and
    sealing an area between said lamp body and said headlight housing such that the portion of said housing extending from said lens approximately to said lamp body and the inner surface of said lamp body and said headlamp bulb are sealed from the atmosphere.

19. A method of making a headlamp unit for a motor vehicle as claimed in claim 18 wherein the step of sealing an area between said lamp body and said headlight housing comprises the steps of:
    securing an inner portion of a resilient seal about said lamp body adjacent to said end of said lamp body; and
    securing an outer portion of said resilient seal to said headlight housing.

20. A method of making a headlamp unit for a motor vehicle as claimed in claim 18 wherein the step of sealing an area between said lamp body and said headlight housing comprises the step of installing a sufficiently resilient seal between said end of said lamp body and said housing to provide shock absorbing support for said lamp body.

* * * * *